(12) United States Patent
Ramlogan et al.

(10) Patent No.: US 8,303,255 B2
(45) Date of Patent: Nov. 6, 2012

(54) SHAFT TRIM BALANCING DEVICES, RELATED SYSTEMS AND METHODS

(75) Inventors: Amarnath Ramlogan, Glastonbury, CT (US); Celerick D. Stephens, New Britain, CT (US); Bradley A. Smith, Deep River, CT (US); Eli J. Morales, San Antonio, PR (US); Carl R. Verner, Windsor, CT (US); Karen Soto, Coamo, PR (US); Michael Abbott, Chicopee, MA (US); John J. O'Connor, South Windsor, CT (US); Kenneth R. Ayers, Kensington, CT (US)

(73) Assignee: United Technologies Corporation, Hartford, CT (US)

( * ) Notice: Subject to any disclaimer, the term of this patent is extended or adjusted under 35 U.S.C. 154(b) by 1326 days.

(21) Appl. No.: 11/923,734

(22) Filed: Oct. 25, 2007

(65) Prior Publication Data

US 2009/0107237 A1    Apr. 30, 2009

(51) Int. Cl.
*F01D 5/02* (2006.01)
(52) U.S. Cl. .................. 416/144; 464/180; 73/470
(58) Field of Classification Search .............. 416/144, 416/145; 464/180; 73/455, 468, 470; 700/279
See application file for complete search history.

(56) References Cited

U.S. PATENT DOCUMENTS

| | | | | |
|---|---|---|---|---|
| 2,426,400 | A | * | 8/1947 | Lampton et al. ............... 416/144 |
| 4,043,147 | A | * | 8/1977 | Wiebe ........................... 464/180 |
| 4,539,864 | A | * | 9/1985 | Wiebe ........................... 74/571.1 |
| 5,214,585 | A | * | 5/1993 | Ehrich .......................... 73/462 |
| 5,280,736 | A | * | 1/1994 | Wesling et al. ............... 74/570.2 |
| 5,285,700 | A | | 2/1994 | Lau |
| 5,545,010 | A | | 8/1996 | Cederwall et al. |
| 5,767,403 | A | | 6/1998 | Kopp et al. |
| 5,831,358 | A | * | 11/1998 | Bobay ............................ 310/58 |
| 6,132,168 | A | | 10/2000 | Kovaleski et al. |
| 6,588,298 | B2 | * | 7/2003 | Czerniak et al. ............... 416/145 |
| 6,829,934 | B2 | | 12/2004 | Wolf et al. |
| 6,931,861 | B2 | | 8/2005 | Wagner |
| 7,059,831 | B2 | | 6/2006 | Suciu et al. |
| 7,234,916 | B2 | | 6/2007 | Lee et al. |
| 2002/0184946 | A1 | | 12/2002 | Wolf et al. |
| 2006/0269357 | A1 | | 11/2006 | Webb |
| 2007/0014629 | A1 | | 1/2007 | Webb |

* cited by examiner

*Primary Examiner* — Ninh H Nguyen
*Assistant Examiner* — Liam McDowell
(74) *Attorney, Agent, or Firm* — Carlson, Gaskey & Olds PC

(57) ABSTRACT

Shaft trim balancing devices, related systems and methods are provided. In this regard, an representative device for trim balancing a rotatable shaft includes: an intermediate section being annularly shaped and having terminating ends spaced from each other in an uncompressed state of the device; and first and second sets of counterweights extending longitudinally from opposing sides of the intermediate section.

20 Claims, 3 Drawing Sheets

US 8,303,255 B2

SHAFT TRIM BALANCING DEVICES, RELATED SYSTEMS AND METHODS

BACKGROUND

1. Technical Field

The disclosure generally relates to trim balancing of shafts.

2. Description of the Related Art

Balancing of rotating components of gas turbine engines oftentimes is desirable in order to reduce excess vibrations. In this regard, various modules of a gas turbine engine typically are separately balanced. By way of example, a turbine disk can be balanced. For those turbine disks that incorporate sacrificial flanges, the material of the flanges can be selectively removed from the turbine disk to achieve balance.

SUMMARY

Shaft trim balancing devices, related systems and methods are provided. In this regard, an exemplary embodiment of a device for trim balancing a rotatable shaft includes: an intermediate section being annularly shaped and having terminating ends spaced from each other in an uncompressed state of the device; and first and second sets of counterweights extending longitudinally from opposing sides of the intermediate section.

An exemplary embodiment of a shaft includes: a rotatable shaft having an inner surface defining a longitudinal bore; and a trim balancing device positioned within the longitudinal bore, the trim balancing device including: an intermediate section being annularly shaped and having terminating ends spaced from each other in an uncompressed state of the trim balancing device; and first and second sets of counterweights extending longitudinally from opposing sides of the intermediate section.

An exemplary embodiment of a method for trim balancing a rotatable shaft includes: installing a trim balance device in a central bore of the shaft, the trim balance device having: an intermediate section being annularly shaped and having terminating ends spaced from each other in an uncompressed state of the trim balance device; and first and second sets of counterweights extending longitudinally from opposing sides of the intermediate section; rotating the shaft with the trim balance device installed therein to determine an unbalanced condition; and removing weight from at least one of the counterweights.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Shaft trim balancing devices, related systems and methods are provided, several exemplary embodiments of which will be described in detail. In some applications, such as those involving high speed and/or narrow shafts, incorporation of independently balanced modules may not result in an attached shaft maintaining acceptable vibration limits, particularly during transient conditions. In this regard, some embodiments can be used for balancing a shaft of a gas turbine engine, for example. By using an exemplary embodiment of a trim balancing device described herein, an entire shaft and associated rotational components can be balanced such that engine level trim balancing of the assembled gas turbine engine may be facilitated. This is in contrast to devices and associated techniques that involve balancing of independent modules, which are attached to a shaft, prior to assembly.

Figure 1:
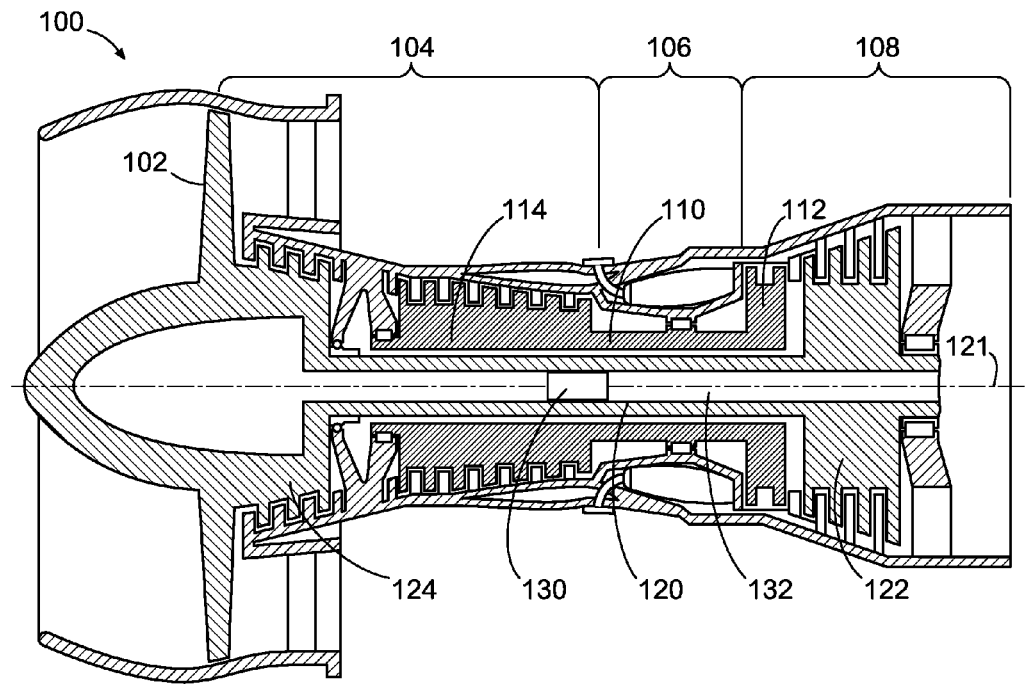
FIG. 1 is a schematic diagram depicting an exemplary embodiment of a gas turbine engine.

In this regard, reference is made to the schematic diagram of FIG. 1, which depicts an exemplary embodiment of a gas turbine engine. As shown in FIG. 1, engine 100 is depicted as a turbofan that incorporates a fan 102, a compressor section 104, a combustion section 106 and a turbine section 108. Although depicted as a turbofan gas turbine engine, it should be understood that the concepts described herein are not limited to use with turbofans or other types of gas turbine engines as the teachings may be applied to other types of engines incorporating rotatable shafts.

Engine 100 of FIG. 1 incorporates a shaft 110, which interconnects high-pressure turbine 112 and high-pressure compressor 114, and a shaft 120, which interconnects low-pressure turbine 122 and low-pressure compressor 124. A trim balancing device 130 also is depicted in FIG. 1. In particular, trim balancing device 130 is installed within a central longitudinal bore 132 of shaft 120 to form a shaft assembly. Notably, trim balancing device 130 is shown in greater detail in FIGS. 2-4.

Figure 2:
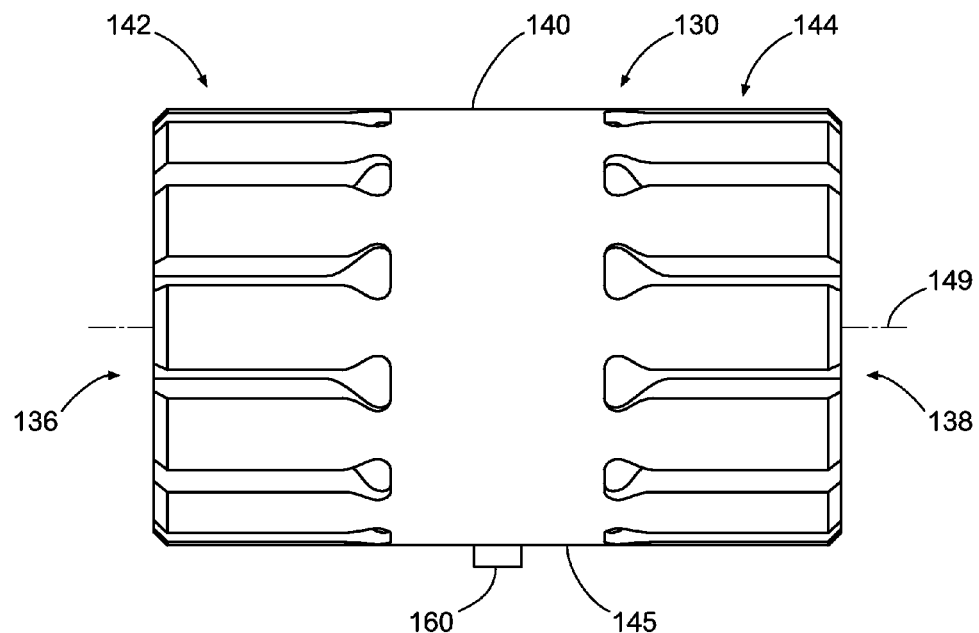
FIG. 2 is a schematic diagram depicting an exemplary embodiment of a trim balancing device that may be used with the gas turbine engine of FIG. 1.
Figure 3:
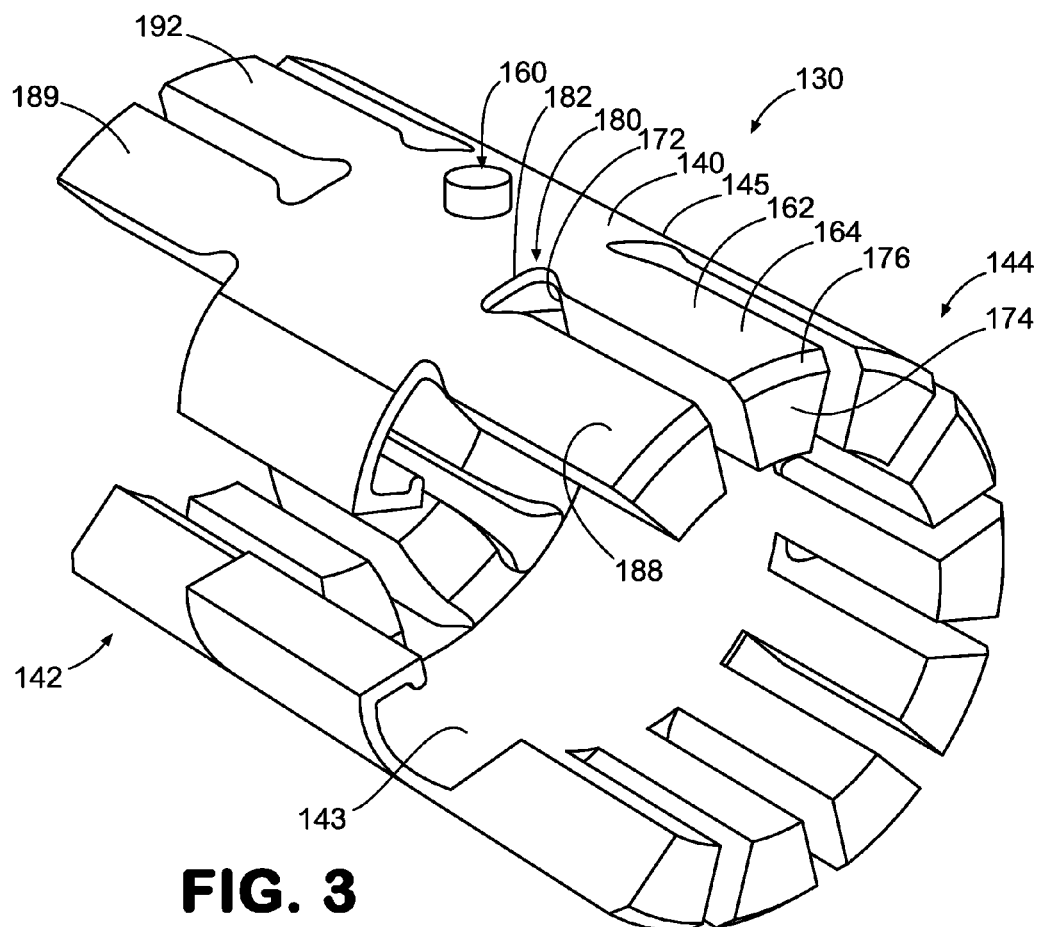
FIG. 3 is a schematic diagram depicting a perspective view of the trim balancing device of FIGS. 1 and 2 showing detail of counterweights and compression tangs.
Figure 4:
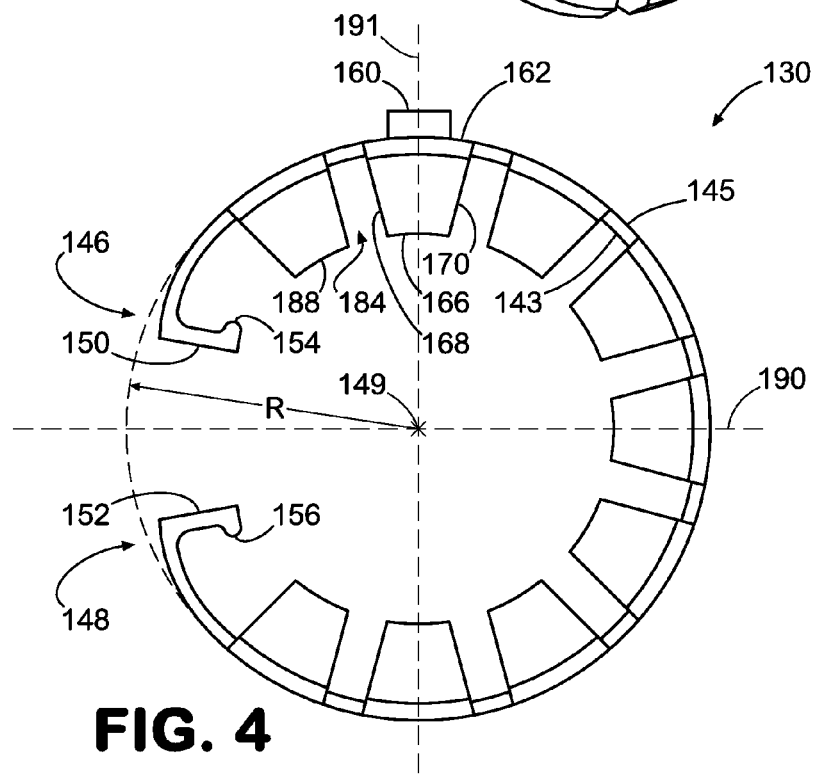
FIG. 4 is a schematic diagram depicting an end view of the embodiment of FIGS. 1-3.

As shown in FIGS. 2-4, trim balancing device 130 includes ends 136, 138 and an intermediate section 140 that is integral with (e.g., 130, 136 and 138 are one piece) ends 136, 138 (see FIGS. 2-5). Sets 142, 144 of counterweights extend longitudinally from opposing sides of intermediate section 140. Although each counterweight in sets 142, 144 is illustrated as extending substantially parallel to a longitudinal axis 121 of shaft 120, it should be appreciated that counterweights in each of sets 142, 144 may extend at other angles with respect to the opposing sides so long as the counterweights of each respective set 142, 144 are substantially parallel to with respect to each other. Intermediate section 140 is a generally rectangular band of material that is configured in an annular shape, with an inner diameter surface 143 and an outer diameter surface 145. Ends 146, 148 of intermediate section 140 are spaced from each other when device 130 is in an uncompressed state, such as depicted in FIG. 4. Note also that in the uncompressed state (FIG. 4), the intermediate section 140 is located at a radius R from a longitudinal axis 149 of the device 130, with the exception of ends 146, 148, which curl radially inwardly toward longitudinal axis 149. This inward curling of ends 146, 148 tends to provide clearance to facilitate installation and removal of the device 130.

Each of the terminating ends 146, 148 incorporates an inwardly extending tang. Thus, end 146 incorporates a tang 150 and end 148 incorporates a tang 152. In this embodiment, a distal end of the tang 150 includes a raised edge 154, and a distal end of tang 152 includes a raised edge 156. The raised edges 154, 156 may reduce slipping of tool jaws from tangs 150, 152, such as during installation and/or removal of device 130 within a shaft. Note that, during installation and/or removal of device 130, the device 130 is typically placed in a compressed state in which tangs 150, 152 are urged toward each other. In this regard, spacing between tangs 150, 152 can be selected, in some embodiments, such that reduction of plastic deformation of the device 130 is facilitated even if the tangs 150, 152 are urged together until the tangs 150, 152 contact each other.

In this regard, plastic deformation can occur in some embodiment. However, such deformation should be managed so that the functionality and/or assembly of the device are not adversely affected. That is, sufficient spring-back should be provided to ensure the device is closely mated inside the shaft.

As best shown in FIGS. 2 and 3, opposing sets 142, 144 of counterweights extend longitudinally outwardly from intermediate section 140. In this embodiment, each set 142, 144 includes nine such counterweights, although various other numbers can be used in other embodiments. Notably, trim balance of a shaft into which device 130 is inserted is achieved by removing material from device 130, such as by removing material from (e.g., removing entirely) one or more of the counterweights.

Each counterweight of this embodiment (e.g., counterweight 162) exhibits a substantially wedge shape. Notably, counterweights may exhibit various shapes, such as rectangular, square or cylindrical. For instance, counterweight 162 of this embodiment includes an outer diameter (OD) surface 164, which is generally configured as an extension of the exterior surface of intermediate section 140, and an inner diameter (ID) surface 166. ID surface 166 is interconnected with the OD surface 164 by sidewalls 168, 170, inner endwall 172 and outer endwall 174. Sidewalls 168, 170 are inwardly inclined from OD surface 164 to ID surface 166. Thus, ID surface 166 is narrower than OD surface 164. This configuration facilitates compression of device 130 as the sidewalls of adjacent counterweights do not impede compression. Notably sidewalls 168, 170 may be perpendicular to, or outwardly inclined from OD surface 164 to ID surface 166. Thus, in some embodiments, ID surface 166 can be wider than or of equal width to OD surface 164.

Outer endwall 174 is substantially perpendicular to the ID and OD surfaces (166, 164). However, in this embodiment, a chamfered edge 176 is included that facilitates insertion of device 130 into a shaft. In contrast, the inner endwall 172 is inclined inwardly from the inner diameter surface 143 of intermediate section 140 to ID surface 166. Notably, outer endwall 174 can be of a convex shape, e.g. chamfer 176 can be replaced with a fillet, or flat endwall 174 combination with a half round surface(s) connecting the ID and OD surfaces (166, 164). The inner endwall 172 may be perpendicular to/or inclined outwardly from the inner diameter surface 143 of intermediate section 140 to ID surface 166.

Between each adjacent pair of counterweights, a relief feature is provided that reduces the stiffness and bending stress of device 130 between adjacent counterweights of a same counterweight set 142, 144. For instance, a relief feature 180 is located between counterweights 162 and 188. In this embodiment, relief feature 180 is a cutout that exhibits a substantially teardrop shape, which includes a base 182 that is wider than a gap 184 formed between adjacent OD surfaces of the counterweights. Notably, relief feature 180 may be configured in various shapes such as circular, square, rectangular or triangular, for example. Notably, counterweights are sized and shaped to provide at least a minimum required metered airflow through a shaft in which device 130 is installed. That is, in contrast to an embodiment that incorporates shorter counterweights that extend farther radially inward in order to provide comparable weight, the counterweights of the depicted embodiment are generally elongate so that disruption of airflow through the shaft is reduced.

As more clearly seen in FIGS. 3 and 4, device 130 incorporates a protrusion 160 that extends radially outwardly from intermediate section 140. With the exception of protrusion 160, device 130 exhibits symmetry along a plane 190 that is coincident with longitudinal axis 149. Device 130 also exhibits asymmetry along a plane that is coincident with a longitudinal axis 191 of protrusion 160. Notably, this asymmetry enables device 130 to provide 360° of trim balance capability as the device 130 can be rotated 180° about the longitudinal axis 191 of the protrusion 160 as will be described in detail.

Protrusion 160 is configured to engage within a corresponding recess 213 (shown in FIG. 5) formed in the inner wall of a shaft into which the device is inserted. Mating of protrusion 160 and the recess facilitates retention of the device 130 in position within the shaft 120 by facilitating a reduction in rotational and/or longitudinal motion of the device 130 relative to the shaft 120. Notably, the protrusion 160 can be solid or hollow and can be provided in various shapes such as cylindrical, rectangular, square, triangular, multifaceted sided or spherical, for example.

Figure 5:
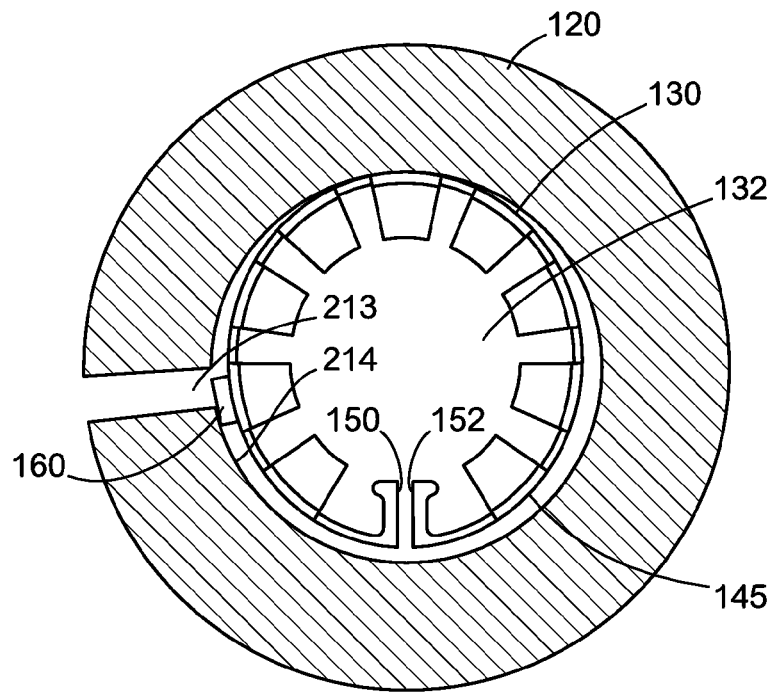
FIG. 5 is a schematic diagram depicting a cross-sectional view the trim balancing device of FIGS. 1-4 in a compressed state and inserted within a bore of a shaft.

Insertion of device 130 within shaft 120 is depicted schematically in FIG. 5. As shown in FIG. 5, device 130 is depicted in a compressed state. That is, tangs 150, 152 are urged toward each other to facilitate insertion of device 130 within the central bore 132 of shaft 120. Note that as depicted, protrusion 160 has not yet been seated within a corresponding recess 213 of the inner surface 214 of the shaft 120. Notably, recess 213 forms a portion of a shaft through-hole. Once protrusion 160 is received within recess 213, outer diameter surface 145 of intermediate section 140 and outer diameter surfaces of the counterweights generally maintain contact with inner surface 214 of the shaft 120.

With respect to performing trim balancing, an embodiment of a method for trim balancing shaft 120 involves rotating shaft 120 with device 130 installed. This is accomplished in order to determine a vector associated with the current unbalance condition of the shaft 120. Based on the direction and magnitude of the unbalance vector, a determination can be made regarding one or more of: whether weight is to be removed from one or more of the counterweights; and to what extent any weight is to be removed. Clearly, weight can be removed from one or more counterweights prior to installation of device 130 in shaft 120.

The determined unbalance vector is then correlated with a location of shaft 120 from which weight should be removed. Such a location of the shaft 120 typically corresponds to the closest counterweights, which can include a single, counterweight, a longitudinally spaced pair of the counterweights (e.g., counterweights 188, 189) or adjacent, longitudinally spaced pairs of the counterweights (e.g., pair 188, 189 and pair 162, 192).

Responsive to determining which of the counterweights are involved, further analysis of the unbalance vector indicates how much weight is to be removed from the affected counterweights. Notably, if it is determined that weight is to be removed from a location that does not include counterweights (e.g., the location associated with tangs 150, 152), device 130 can be removed from the shaft 120, rotated 180° about the longitudinal axis 191 of protrusion 160, and reinstalled. As such, the counterweights are relocated relative to the shaft 120 based upon the asymmetry exhibited by device 130 about the longitudinal axis 191 of the protrusion 160.

In order to facilitate proper location and identification of the counterweights, various indicia can be included in some embodiments. By way of example, each counterweight can be numbered. Additionally or alternatively, device 130 can include an indicator (e.g., an arrow) that indicates a preferred direction of insertion.

With respect to weight removal, weight can be removed, e.g., incrementally removed, from one or more of the affected counterweights. Thereafter, the process of rotating the shaft to determine the current unbalance vector can be repeated. Thus, determination of the current unbalance vector, analysis of the vector, and removal of weight from one or more affected counterweights can occur iteratively until desired balance of the shaft is achieved. Notably, the aforementioned process can be performed after one or more modules (e.g., a turbine module) have been (optionally) independently balanced and attached to the shaft. Therefore, in some embodiments, such as those involving high speed and/or narrow shafts, the entire shaft assembly can be balanced to maintain acceptable vibration limits, particularly during transient conditions.

It is also noted that a shaft may be balanced at high or low speed without a trim balance device installed. This allows for continuation of additional shaft processing. The trim balance device may then be installed in a near-zero imbalance state without significantly affecting the dynamic response of the system.

Figure 6:
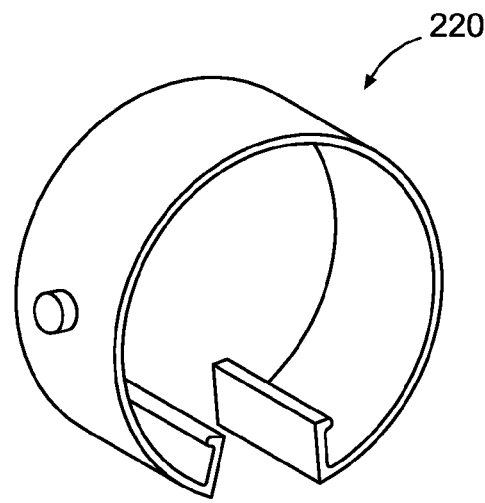
FIG. 6 is a schematic diagram depicting an exemplary embodiment of a trim balancing device with counterweights removed.

In some embodiments, contact between the outer surface of a trim balancing device and the inner surface of a shaft in which the device is installed can facilitate creation of a gas tight seal, for example, such that flow of gases through a recess in a shaft surface may be reduced. For example, in installing the trim balancing device 130, protrusion 160 may engage the recess 213 of the shaft 120 such that outer diameter surface 145 contacts inner surface 214 to facilitate creation of a gas tight seal between the device 130 and the shaft 120 such that the device 130 functions as a hole plug device. In some configurations that do not require trim balancing, all of the counterweights may be removed such that a trim balancing device can function solely as a hole plug device. Notably, FIG. 6 depicts an embodiment of a trim balancing device 220 in which all of the counterweights have been removed.

It should be noted that a device similar to device 220 may be deliberately manufactured without counterweights, for the purpose of plugging a through hole, from the shaft ID bore, such as the recess 213 in FIG. 5. This is the case for a shaft and engine assembly that is well balanced without the installation of the trim balance device 130, but requires a much lighter weight device to plug the hole and prevent gas ingestion.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. By way of example, a shaft may be balanced at high or low speed without the trim balance device installed. This allows for continuation of additional shaft processing. The trim balance device may then be installed in a near-zero imbalance state without significantly affecting the dynamic response of the system. All such modifications and variations are intended to be included herein within the scope of this disclosure and protected by the accompanying claims.

The invention claimed is:

1. A device for trim balancing a rotatable shaft comprising:
   an intermediate section being annularly shaped and having terminating ends spaced from each other in an uncompressed state of the device; and
   first and second sets of counterweights extending longitudinally from opposing sides of the intermediate section wherein said intermediate section and said first and second sets of counterweights are integral with each other and are one piece.

2. The device of claim 1, wherein:
   the shaft has an inner surface defining a longitudinal bore; and
   the device is sized and shaped to be inserted into the bore such that an outer diameter surface of the intermediate section contacts the inner surface of the shaft and the counterweights extend substantially parallel to a longitudinal axis of the shaft.

3. A shaft assembly comprising:
   a rotatable shaft having an inner surface defining a longitudinal bore: and
   a trim balancing device positioned within the longitudinal bore, the trim balancing device comprising:
   an intermediate section being annularly shaped and having terminating ends spaced from each other in an uncompressed state of the trim balancing device; and
   first and second sets of counterweights extending longitudinally from opposing sides of the intermediate section wherein said intermediate section and said first and second sets of counterweights are integral with each other and are one piece.

4. A method for trim balancing a rotatable shaft comprising:
   installing a trim balance device in a central bore of the shaft, the trim balance device having:
   an intermediate section being annularly shaped and having terminating ends spaced from each other in an uncompressed state; and
   first and second sets of counterweights extending longitudinally from opposing sides of the intermediate section wherein said intermediate section and said first and second sets of counterweights are integral with each other and are one piece;
   rotating the shaft with the trim balance device installed therein to determine at least one of an unbalance condition and a balance condition; and
   removing weight from at least one counterweight of the first and second sets based on the least one of an unbalance condition and a balance condition.

5. A device for trim balancing a rotatable shaft comprising:
   an intermediate section being annularly shaped and having terminating ends spaced from each other in an uncompressed state of the device; and
   first and second sets of counterweights extending longitudinally from opposing sides of the intermediate section and wherein:
   in the uncompressed state, the intermediate section is located a distance R from the longitudinal axis of the device; and the terminating ends are located less than the distance R from the longitudinal axis of the device.

6. The device of claim 5, wherein the terminating ends curl radially inwardly.

7. A device for trim balancing a rotatable shaft comprising:
an intermediate section being annularly shaped and having terminating ends spaced from each other in an uncompressed state of the device;
first and second sets of counterweights extending longitudinally from opposing sides of the intermediate section;
a first tang extending radially inwardly from a first of the terminating ends; and
a second tang extending radially inwardly from a second of the terminating ends.

8. The device of claim 7, further comprising a raised edge located at a distal end of each of the tangs.

9. The device of claim 7, wherein, in a compressed state, in which the tangs are urged together, a selected spacing defined between the terminating ends facilitates a reduction in plastic deformation of the intermediate section.

10. A device for trim balancing a rotatable shaft comprising:
an intermediate section being annularly shaped and having terminating ends spaced from each other in an uncompressed state of the device; and
first and second sets of counterweights extending longitudinally from opposing sides of the intermediate section;
the intermediate section has an outer diameter surface; and
the device further comprises a protrusion extending radially outwardly from the outer diameter surface, the protrusion being operative to engage a corresponding recess of the shaft to facilitate reduction of movement of the device relative to the shaft.

11. A device for trim balancing a rotatable shaft comprising:
an intermediate section being annularly shaped and having terminating ends spaced from each other in an uncompressed state of the device;
first and second sets of counterweights extending longitudinally from opposing sides of the intermediate section;
wherein at least one of said counterweights includes an outer diameter surface;
an inner diameter surface disposed radially inward of the outer diameter surface; and
first and second sidewalls inclined radially inward to converge from opposing edges of the outer diameter surface toward corresponding edges of the inner diameter surface.

12. The device of claim 11, wherein at least one of said counterweights further comprises an inner end wall inclined radially inward from the intermediate section towards the inner diameter surface.

13. A device for trim balancing a rotatable shaft comprising:
an intermediate section being annularly shaped and having terminating ends spaced from each other in an uncompressed state of the device;
first and second sets of counterweights extending longitudinally from opposing sides of the intermediate section; and
a relief feature located between two adjacent counterweights of one of the sets of counterweights.

14. A shaft assembly comprising:
a rotatable shaft having an inner surface defining a longitudinal bore: and
a trim balancing device positioned within the longitudinal bore, the trim balancing device comprising:
an intermediate section being annularly shaped and having terminating ends spaced from each other in an uncompressed state of the trim balancing device;
first and second sets of counterweights extending longitudinally from opposing sides of the intermediate section;
the inner surface of the shaft includes a recess; and
the trim balancing device has a protrusion operative to engage the recess to facilitate reduction of movement of the trim balancing device relative to the shaft.

15. The shaft assembly of claim 14, wherein:
the shaft includes a hole extending from the bore to an outer diameter surface of the shaft; and
the recess forms a portion of the hole.

16. The shaft assembly of claim 14, wherein, when the protrusion engages the recess, the trim balancing device facilitates formation of a gas tight seal with at least a portion of the inner surface of the shaft.

17. The shaft assembly of claim 14, wherein the shaft is a gas turbine engine shaft.

18. A method for trim balancing a rotatable shaft comprising:
installing a trim balance device in a central bore of the shaft, the trim balance device having:
an intermediate section being annularly shaped and having terminating ends spaced from each other in an uncompressed state; and
first and second sets of counterweights extending longitudinally from opposing sides of the intermediate section;
rotating the shaft with the trim balance device installed therein to determine at least one of an unbalance condition and a balance condition; removing weight from at least one counterweight of the first and second sets based on the least one of an unbalance condition and a balance condition;
the trim balance device has a first end, an opposing second end and a protrusion;
the shaft has a recess; and
in installing the trim balance device, the first end is first inserted into the bore and the trim balance device is urged along a length of the bore until the protrusion engages the recess.

19. The method of claim 18, wherein in installing the trim balance device, engaging the protrusion and the recess facilitates creation of a gas tight seal.

20. A method for trim balancing a rotatable shaft comprising:
installing a trim balance device in a central bore of the shaft, the trim balance device having:
an intermediate section being annularly shaped and having terminating ends spaced from each other in an uncompressed state; and
first and second sets of counterweights extending longitudinally from opposing sides of the intermediate section;
rotating the shaft with the trim balance device installed therein to determine at least one of an unbalance condition and a balance condition; removing weight from at least one counterweight of the first and second sets based on the least one of an unbalance condition and a balance condition:
the trim balance device has a first end and an opposing second;
in installing the device, the first end is first inserted into the bore and the device is urged along a length of the bore;
the method further comprises:
removing the device from the bore; and
reinstalling the device with the second end being first inserted into the bore.

* * * * *